July 27, 1954 A. C. SCHROEDER ET AL 2,685,062

SIGNAL TRANSMISSION ANALYZING SYSTEM

Filed July 18, 1950 2 Sheets-Sheet 1

INVENTORS
ALFRED C. SCHROEDER
& KARL R. WENDT
BY
ATTORNEY

INVENTORS
ALFRED C. SCHROEDER
& KARL R. WENDT
BY
[signature]
ATTORNEY

Patented July 27, 1954 2,685,062

UNITED STATES PATENT OFFICE 2,685,062

SIGNAL TRANSMISSION ANALYZING SYSTEM

Alfred C. Schroeder, Feasterville, Pa., and Karl R. Wendt, Eggertsville, N. Y., assignors to Radio Corporation of America, a corporation of Delaware Application July 18, 1950, Serial No. 174,494

12 Claims. (Cl. 324—57)

This invention relates to analyzing systems for signal transfer devices. In particular, the invention relates to analyzing systems in which simultaneous indications are obtained of different characteristics of signal transfer devices.

In order to properly align or otherwise adjust a signal transfer device, such as an amplifier, for example, it is necessary to know the different characteristics of the device over a band of operating frequencies. The two characteristics which are of most importance are the amplitude and phase characteristics of the signal transfer device. Such information is particularly useful where the device is required to transfer signals having frequencies varying within a relatively large range. The changes in the characteristics of the signal transfer device at different frequencies may vary considerably. One signal transfer device of the type required to pass, without substantial discrimination, signals varying through a relatively wide band of frequencies is a video signal amplifier embodied in a television system. Such amplifiers are required to have substantially uniform characteristics over a band of frequencies equal substantially to 6 megacycles.

In order to determine both the phase and amplitude characteristics of a signal transfer device such as a video signal amplifier by the point-to-point method requires the expenditure of considerable time and is an extremely tedious operation. Accordingly, it is desirable to have available, for purposes of determining the characteristics of a wide band signal transfer device, a system which substantially concurrently will provide a continuous visual indication of the characteristics throughout the entire frequency pass band.

Accordingly, an object of the present invention is to provide apparatus for analyzing and indicating the transmission characteristics of a signal transfer device substantially simultaneously for all frequencies within a predetermined range.

Another object of the invention is to provide apparatus for analyzing and continuously and substantially simultaneously indicating both the amplitude and phase characteristics of a signal transfer device at all frequencies within a predetermined range.

According to the invention, the analyzing and indicating apparatus includes a source of a plurality of test signals. Each test signal is caused to vary periodically through a range of frequencies corresponding substantially to the desired frequency pass band of the signal transfer device being tested. One set of test signals differs from at least one of the other test signals at all points in their respective ranges by a given frequency. At least one of these test signals is impressed upon the signal transfer device. Indicating means including a frequency modulation detector is coupled to the signal transfer device to show the phase characteristic of the device. A similarly coupled indicating means including an amplitude modulation detector may be used to show the amplitude characteristic of the device.

In one illustrative form of the invention, two sets of test signals of the character described are impressed respectively upon the input terminal of a pair of signal transmission channels. The device to be analyzed is included in one of the transmission channels. The output terminals of the transmission channels are coupled to a frequency mixer which functions to produce in its output circuit an output signal having a frequency substantially equal to the difference frequency between the two sets of test signals. This output frequency will be modulated in amplitude in accordance with the amplitude characteristic of the device being analyzed. The output frequency also will be modulated in frequency in accordance with the phase characteristic of the signal transfer device. The amplitude and frequency detecting apparatus is coupled to the frequency mixer to develop respective voltages representative of the amplitude and phase characteristics of the signal transfer device. These developed voltages may be employed to actuate indicating apparatus such as one or more cathode ray tubes, for example.

In another illustrative form of the invention, more than one of the test signals are impressed upon the signal transfer device. In this case the indication of the phase characteristic of the device is displayed in a form somewhat different from that of the other arrangement.

The invention will be more fully understood by reference to the following description of several illustrative embodiments thereof. This description is taken in conjunction with the accompanying drawings.

Figure 1:
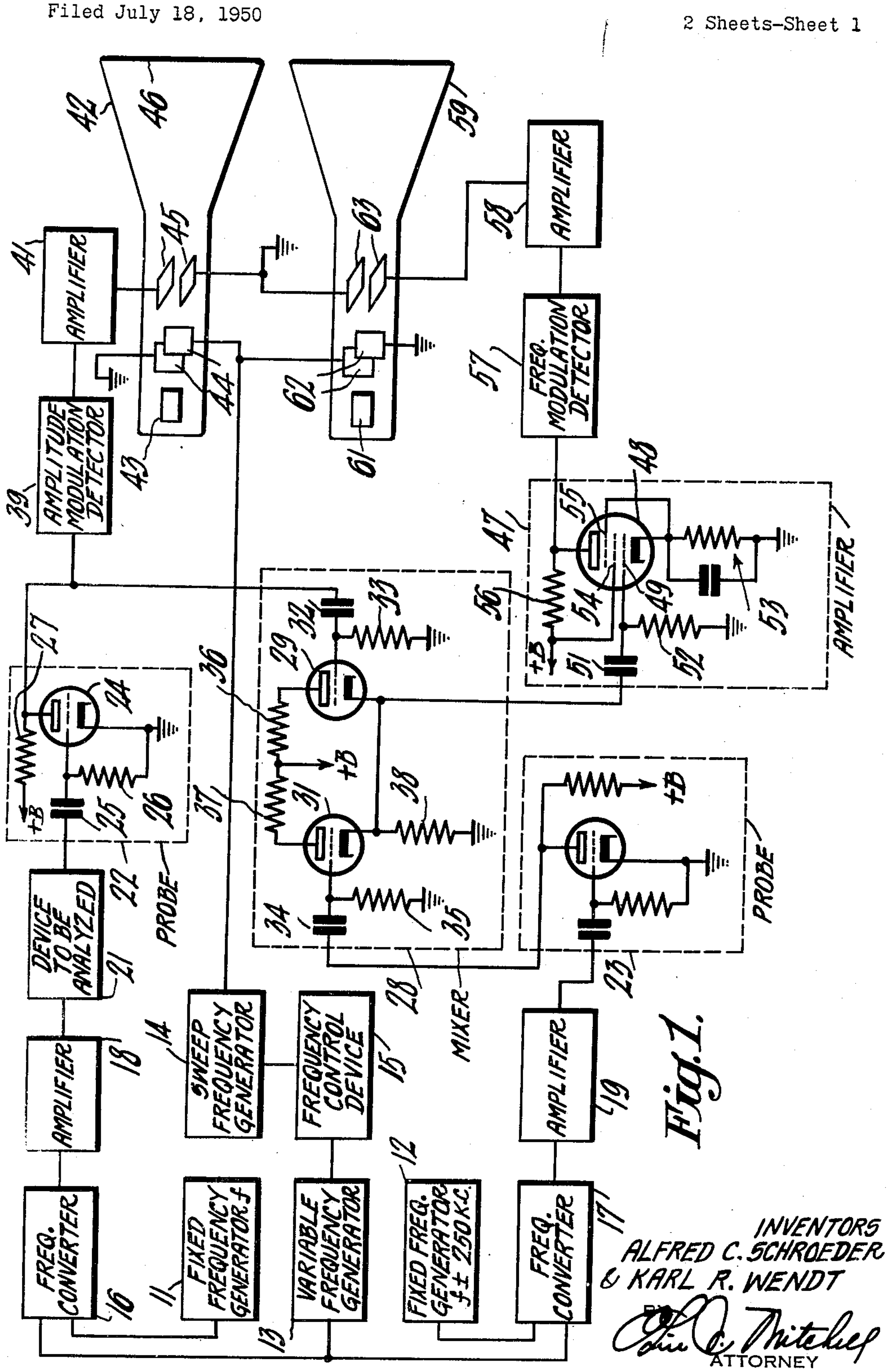
Figure 1 is a circuit diagram, partly in block form, of one illustrative embodiment of the invention.

Having reference now to Figure 1 of the drawings, the invention will be described with reference to one illustrative embodiment thereof. Two sets of test signals of variable frequency may be developed from two fixed frequency generators 11 and 12 and a variable frequency generator 13. For the purpose of this description, it is assumed that the fixed frequency generator 12 has a frequency which is approximately 250 kilocycles different from the frequency of the generator 11. The variable frequency generator 13 is assumed to vary over a 6 megacycle range.

The variation in the frequency of the generator 13 is produced under the control of a sweep frequency generator 14 and a frequency control device 15. The sweep frequency generator 14 may be any conventional saw-tooth voltage generator operating, for example, at a frequency of 5 kilocycles. The frequency control device 15 also may be conventional and may consist of a reactance tube coupled to the frequency determining circuit of the variable frequency generator 13. Thus, the frequency developed by the generator 13 varies over a 6 megacycle range at a 5 kilocycle rate.

One set of test signals is developed by combining the outputs of the fixed frequency generator 11 and the variable frequency generator 13 in a frequency converter 16. This device also may be conventional, for example, of the form of a frequency mixer tube to be described subsequently. Alternatively, it may be in the form of a frequency converter provided in superheterodyne receivers. The other set of test signals is developed by combining the outputs of the fixed frequency generator 12 and the variable frequency generator 13 in a second frequency converter 17. The first and second sets of test signals are amplified respectively by amplifiers 18 and 19.

It will be appreciated that, by reason of the manner in which the two sets of test signals are developed, each will vary through substantially the same 6 megacycle range at the same 5 kilocycle rate. The difference, however, is that at corresponding times the frequencies always differ by substantially 250 kilocycles.

One set of test signals is passed through the signal transfer device 21. Accordingly, this device is coupled to the amplifier 18. The output of the signal transfer device 21 is coupled to a probe circuit 22. Similarly, the output of the amplifier 19 is coupled to the input of a substantially identical probe circuit 23.

The probe circuit 22 consists essentially of an electron tube 24. The control grid of the tube 24 is coupled by a capacitor 25 to the signal transfer device 21. A leak resistor 26 is provided for the coupling capacitor. The cathode of the tube is grounded and the anode is connected to a source of space current indicated at +B through a load resistor 27. The probe circuit 23 is substantially identical to the probe 22 and will not be described in further detail.

The output terminals of the probes 22 and 23 are coupled respectively to a frequency mixer 28. This device consists essentially of a pair of electron tubes 29 and 31 which, as illustrated, may be triodes. The control grid of the tube 29 is coupled by a capacitor 32 to the anode of the tube 24 of the probe 22. A resistor 33 provides a leak circuit to ground for the coupling capacitor 32. In a like manner, a capacitor 34 and a leak resistor 35 couples the output of the probe 23 to the control grid of the mixer tube 31. Space current for the mixer tubes 29 and 31 is provided from a source indicated at +B through respective load resistors 36 and 37. The cathodes of the mixer tubes are connected together and also through a resistor 38 to ground. This circuit arrangement effectively makes the mixer tubes cathode followers so that an output frequency may be derived from the tube cathodes.

The set of test signals derived from the amplifier 19 are coupled into the frequency mixer 28 without substantial modification either of amplitude or phase. However, the set of test signals which are derived from the amplifier 18 is coupled into the mixer 28 in a modified form which is representative of the transmission characteristics of the signal transfer device 21. The mixer 28 is a non-linear device so that it produces in its output a voltage wave having a frequency which is the difference between the test signals from amplifier 18 and amplifier 19. Accordingly, the output signal frequency derived from the cathodes of the mixer tubes 29 and 31 has an amplitude modulation corresponding to the amplitude characteristic of the device being analyzed. Likewise, it has a frequency modulation corresponding to the phase characteristic of the signal transfer device.

Figures 2, 3:
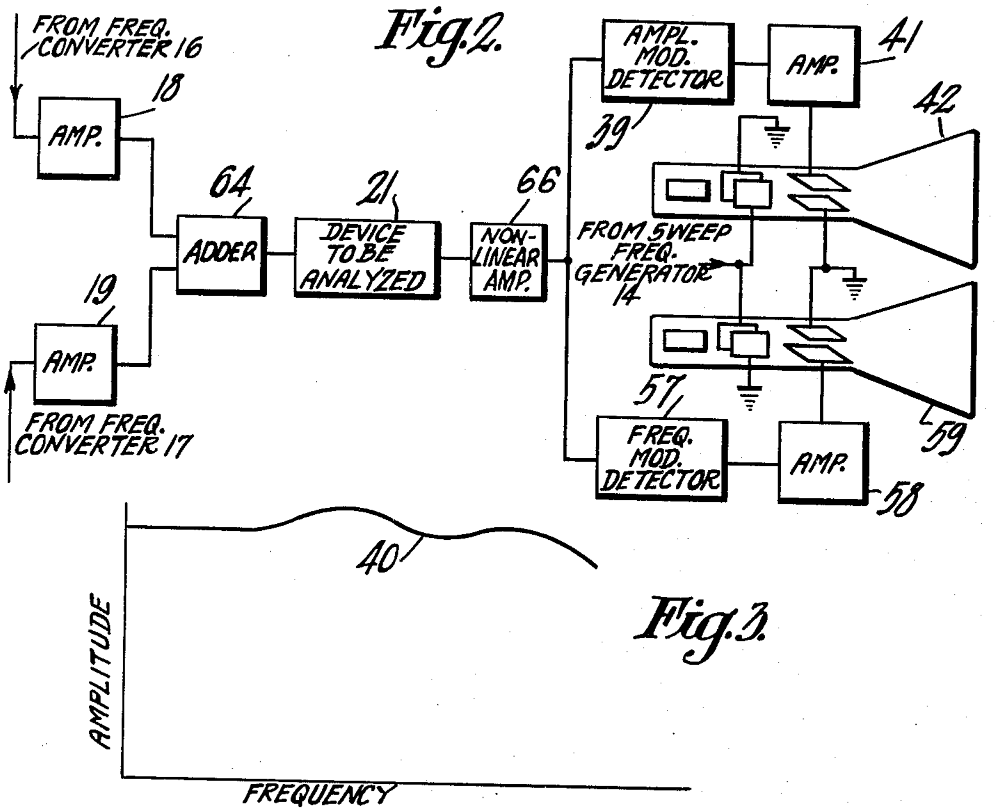
Figure 2 is a fragmentary circuit diagram, also in block form, of another illustrative embodiment of the invention.
Figure 3 is a curve showing the type of display of the amplitude characteristic obtained with either of the illustrative embodiments of the invention.

In this form of the invention, an amplitude modulation detector 39 is coupled to the output of the probe circuit 22. By this means, there is determined the amplitude modulation of the continuously varying frequency which is produced by the signal transfer device 21. The varying amplitude unidirectional voltage derived from the output of the detector 39 represents the amplitude characteristic of the device 21. The amplitude variations are determined as functions of the frequencies in the predetermined range in which the device 21 is to be responsive. In Figure 3, the curve 40 is representative of the amplitude characteristic of the device 21.

The amplitude-modulated signals derived from the detector 39 of Figure 1 are impressed upon an amplifier 41. The output of this amplifier is coupled to an indicating device such as a cathode ray tube 42.

The cathode ray tube 42 is provided with an electron gun 43, a pair of horizontal deflecting plates 44 and a pair of vertical deflecting plates 45. It will be evident that the invention is not limited for use with indicating devices such as a cathode ray tube having electrostatic beam deflecting facilities. If a cathode ray tube is employed as the indicating device, it may be provided alternatively with electromagnetic deflection means without departing from the scope of this invention.

In order to suitably synchronize the sweep of the electron beam of the tube 42 over the luminescent screen 46 thereof, the horizontal deflecting plates 44 are coupled to the sweep frequency generator 14. Hence, with the assumed rate of operation of this generator, the electron beam of the tube 42 is caused to sweep across the screen at a 5 kilocycle frequency. The amplifier 41 is coupled to the vertical deflecting plates 45 so that the vertical deflection of the electron beam, as it is swept across the screen 46, varies in accordance with the amplitude-modulated signal derived from the detector 39. Thus, it is seen that the cathode ray tube 42 provides a continuous indication of the amplitude characteristic of the signal transfer device 21 simultaneously at all frequencies within the range in which it is desired that the device operate. This indication is in the form of the curve 40 of Figure 3.

The output of the frequency mixer 28 is coupled to a buffer amplifier 47. This amplifier consists essentially of an electron tube 48 which, in a preferred embodiment, is a pentode. The control grid 49 of this tube is coupled by a capacitor 51 and a leak resistor 52 to the output cathode electrodes of the mixer tubes 29 and 31. The cathode of the amplifier tube is connected to ground through a conventional self-biasing network 53. The screen and suppressor grids 54 and 55 are connected conventionally to a source of positive voltage indicated as +B and to the cathode of the tube, respectively. The anode of the tube is coupled to a source of positive voltage +B through a load resistor 56.

The output of the buffer amplifier 47 is derived from the anode of the tube 48 which is coupled to a frequency modulation detector 57. This detector may be a conventional device such as a combined amplitude limiter and discriminator or a ratio detector. The output of the detector, therefore, consists of a unidirectional voltage which varies in amplitude in accordance with the phase characteristic of the signal transfer device 21. This signal is impressed upon an amplifier 58, the output of which is coupled to a second indicating device such as a cathode ray tube 59.

Figure 4:
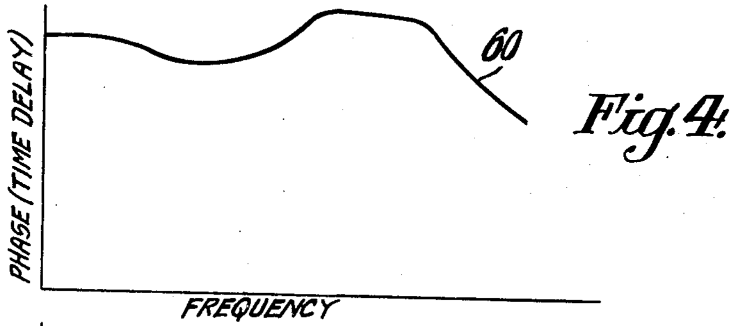
Figure 4 is a curve showing the type of display of the phase characteristic obtained with the form of the invention shown in Figure 1.

In this form of the invention, the phase characteristic of the device 21 is represented by a unidirectional voltage which varies in amplitude in accordance with the phase delay in time of the test signals. A typical phase characteristic of the signal transfer device is indicated by the curve 60 of Figure 4.

This cathode ray tube also is provided with an electron gun 61, a pair of horizontal deflection plates 62 and a pair of vertical deflection plates 63. The electron beam is swept horizontally, under the control of the plates 62, substantially at a 5 kilocycle rate by virtue of the coupling of these plates to the sweep frequency generator 14. Vertical deflections of the beam are in accordance with the varying amplitude signal derived from the amplifier 58. The cathode ray tube 59 provides a continuous indication of the phase characteristic of the signal transfer device 21 simultaneously at all frequencies in the range in which the device is to be operated.

The reason that the energy derived from the cathodes of the mixer tubes 29 and 31 is a wave having substantially a 250 kilocycle frequency and is frequency-modulated in accordance with the phase delay characteristic of the signal transfer device 21 will be appreciated from the following description. Any phase delay produced by the device 21 causes the frequency of the wave derived from its output circuit to be higher than if no phase delay existed. The reason for this is that the frequency of the generated wave changes in the time required for such a wave to be transferred through the device 21. Thus, there is a frequency difference between the wave derived from the device 21 and the undelayed wave derived from the amplifier 19. When these two frequencies are combined in the mixer 28, a beat frequency is produced. This beat frequency varies as a function of the delay introduced by the signal transfer device 21. It merely remains to detect by conventional methods this frequency-modulation of the output wave derived from the mixer 28 to give an indication of the phase characteristic of the device 21.

The information regarding the phase characteristic of a signal transfer device may be obtained in a somewhat different form by means of the system shown in Figure 2 to which reference now will be made. It will be understood that the frequencies derived respectively from amplifiers 18 and 19 are continuously varying and at all times differ from one another by a predetermined amount such as 250 kilocycles. Instead of transferring these two test signal waves through separate channels, they are combined in an adder 64 to which amplifiers 18 and 19 are coupled. This adder 64 may be a conventional circuit and is essentially a linear circuit.

The output of the adder 64 is coupled to the device 21 to be analyzed. Thus, it is seen that both sweep frequency test signals are impressed upon the signal transfer device as a single composite signal.

The output of the device 21 contains the composite signal which was applied to its input, and which may have been so acted upon as to cause frequency or amplitude modulation to be introduced. The phase characteristic of the device is represented by a frequency modulation of the difference in the frequency which exists between the two test signals which were combined into the composite signal by circuit 64. However, this modulation cannot be detected unless the frequency wave representing the difference between the two test signals comprising the composite wave is first extracted. This extraction is accomplished by means of the non-linear 250 kc. amplifier 66 which also serves as a buffer. As a result, the output of amplifier 66 is substantially a 250 kc. wave which may be amplitude or frequency detected by detectors 39 and 57 respectively. The amplitude modulation is a representation of the amplitude characteristic of the signal transfer device and is displayed by the cathode ray tube 42. Similarly, the frequency modulation represents the phase characteristic of the signal transfer device and is displayed by the cathode ray tube 59. The essential point is that a wave having a frequency equal to the difference between the components of the composite signal must first be obtained before application to amplitude and frequency modulation detectors 39 and 57 respectively.

Figure 5:
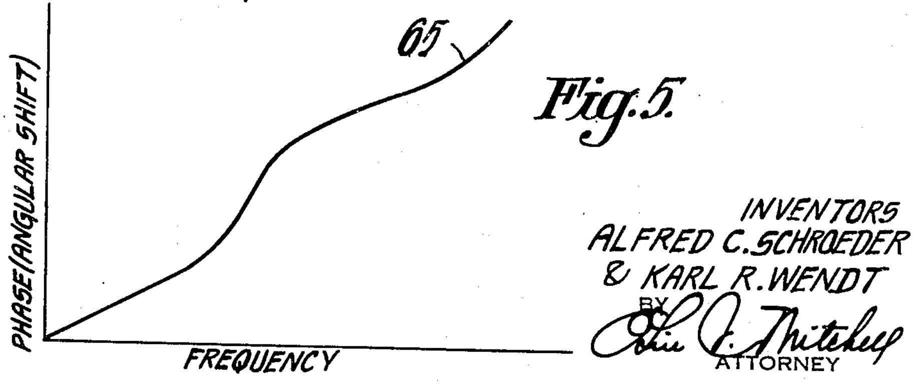
Figure 5 is a curve showing the type of display of the phase characteristic obtained with the form of the invention shown in Figure 2.

The display by the cathode ray tube 59 is in the typical form shown by the curve 65 of Figure 5. It is seen that the amplitude of the curve 65 represents the angular phase shift of the test signals produced by the device 21. This type of indication is obtained by the constant frequency difference of the varying frequency test signals simultaneously impressed upon the device 21. Thus, at any frequency within the given 6 megacycle range, the composite signal derived from the signal transfer device represents the slope of the phase characteristic curve 65.

It is seen, therefore, that, by means of the illustrated embodiments of the present invention, both the amplitude and phase characteristics of a signal transfer device may be continuously displayed by indicating apparatus for all points in a predetermined frequency range. The display device may be a cathode ray tube as shown, Other forms of indicating devices may be used if desired. For example, indicating and/or recording voltmeters may be substituted for the cathode ray tubes. Alternatively, if a cathode ray tube is to be used as the indicating or display device, both the amplitude and the phase characteristics of the signal transfer device may be displayed substantially concurrently by a single tube. In such a case, a suitable switching system such as of conventional electronic switches may be used to couple the cathode ray tube alternately to the amplitude and frequency modulation detectors.

The nature of the invention may be determined from the two illustrated embodiments thereof which have been described. The scope of the invention is set forth in the appended claims.

What is claimed is:

1. Apparatus for analyzing and indicating the transmission characteristics of a signal transfer device in a predetermined frequency range, said apparatus comprising, means for producing a plurality of test signals, each continuously varying periodically through a range of frequencies corresponding substantially to said predetermined frequency range, said individual test signals differing from one another at all points in their respective ranges by a given frequency, means coupled to said test signal producing means to mix said test signals in a manner to produce a composite signal having a frequency substantially equal to said given test signal frequency difference, means coupled to said test signal producing means to impress one of said test signals upon said signal transfer device, and means including a frequency modulation detector coupled to receive the output of said signal transfer device and of said test signal frequency mixing means to indicate the phase characteristic of said device.

2. Analyzing and indicating apparatus as defined in claim 1, in which said test signal-impressing means impresses more than one of said plurality of test signals upon said signal transfer device.

3. Analyzing and indicating apparatus as defined in claim 1, in which said test signal-impressing means impresses all of said plurality of test signals upon said signal transfer device.

4. Apparatus for analyzing and indicating the transmission characteristics of a signal transfer device in a predetermined frequency range, said apparatus comprising, means for producing a plurality of test signals, each continuously varying periodically through a range of frequencies corresponding substantially to said predetermined frequency range, said individual test signals differing from one another at all points in their respective ranges by a given frequency, means coupled to said test signal producing means to mix said test signals in a manner to produce a composite signal having a frequency substantially equal to said given test signal frequency difference, means coupled to said test signal-producing means to impress one of said test signals upon said signal transfer device, means including an amplitude modulation detector coupled to said signal transfer device to indicate the amplitude characteristic of said device, and means including a frequency modulation detector coupled to receive the output of said signal transfer device and of said test signal frequency mixing means to indicate the phase characteristic of said device.

5. Analyzing and indicating apparatus as defined in claim 4, in which said test signal-impressing means impresses all of said plurality of test signals upon said signal transfer device.

6. Apparatus for analyzing and indicating the transmission characteristics of a signal transfer device over a predetermined frequency band, said apparatus comprising, first and second sources of test signals, each varying periodically through a range of frequencies corresponding substantially to said predetermined frequency band, said first and second test signals differing from one another at all points in their respective ranges by a given frequency, means impressing said first test signals upon said signal transfer device for transfer therethrough, means to combine said second test signals with said transferred first signals, means including an amplitude modulation detector coupled to said signal transfer device to indicate the amplitude characteristic of said device, and means including a frequency modulation detector coupled to said signal combining means to indicate the phase characteristic of said device.

7. Apparatus for analyzing and indicating the transmission characteristics of a signal transfer device having a predetermined frequency pass band, said apparatus comprising, first and second sources of test signals, each varying periodically through a range of frequencies corresponding substantially to said predetermined frequency pass band, said first and second test signals differing from one another at all points in their respective ranges by a given frequency, a pair of signal transmission channels each having input and output terminals, said signal transfer device being included in one of said channels, means impressing said first and second test signals upon the respective input terminals of said channels, means coupled to the output terminals of said channels to combine said first and second test signals, means including an amplitude modulation detector coupled to said signal transfer device to indicate the amplitude characteristic of said device, and means including a frequency modulation detector coupled to said signal combining means to indicate the phase characteristic of said device.

8. Apparatus for analyzing and indicating the transmission characteristics of a signal transfer device having a predetermined frequency pass band, said apparatus comprising, first and second sources of test signals, each varying periodically through a range of frequencies corresponding substantially to said predetermined frequency pass band, said first and second test signals differing from one another at all points in their respective ranges by a given frequency, a pair of signal transmission channels, each having input and output terminals, said signal transfer device being included in one of said channels, means impressing said first and second test signals upon the respective input terminals of said channels, a frequency mixer coupled to the output terminals of said channels, means including an amplitude modulation detector coupled to the output terminal of the channel including said signal transfer device to indicate the amplitude characteristic of said device, and means including a frequency modulation detector coupled to said frequency mixer to indicate the phase characteristic of said device.

9. Apparatus for analyzing and indicating the transmission characteristics of a signal transfer device having a predetermined frequency pass band, said apparatus comprising means for producing first and second test signals, each varying periodically through a range of frequencies corresponding substantially to said predetermined pass band, said first and second test signals differing from one another at all points in their respective ranges by a given frequency, said test signal-producing means including two generators of fixed frequencies differing by said given frequency, a generator of a frequency varying periodically through a range of frequencies corresponding in extent to that of said predetermined frequency pass band, and two frequency converters, each coupled to said varying frequency generator and to a different one of said fixed frequency generators, a pair of signal transmission channels, each having input and output terminals, said signal transfer device being included in one of said channels, means impressing said first and second test signals upon the respective input terminals of said channels, a frequency mixer coupled to the output terminals of said channels, means including an amplitude modulation detector coupled to the output terminal of the channel including said signal transfer device to indicate the amplitude characteristic of said device, and means including a frequency modulation detector coupled to said frequency mixer to indicate the phase characteristic of said device.

10. Apparatus for analyzing and indicating the transmission characteristics of a signal transfer device over a predetermined frequency band, said apparatus comprising, first and second sources of test signals, each varying periodically through a range of frequencies corresponding substantially to said predetermined frequency band, said first and second test signals differing from one another at all points in their respective ranges by a given frequency, means impressing both said first and second test signals upon said signal transfer device, means including an amplitude modulation detector coupled to said signal transfer device to indicate the amplitude characteristic of said device, and means including a frequency modulation detector coupled to said signal transfer device to indicate the phase characteristic of said device.

11. Apparatus for analyzing and indicating the transmission characteristics of a signal transfer device having a predetermined frequency pass band, said apparatus comprising, first and second sources of test signals, each varying periodically through a range of frequencies corresponding substantially to said predetermined frequency pass band, said first and second test signals differing from one another at all points in their respective ranges by a given frequency, means coupled to said test signal sources to combine said first and second test signals and to impress said combined test signals upon said signal transfer device, means including an amplitude modulation detector coupled to said signal transfer device to indicate the amplitude characteristic of said device, and means including a frequency modulation detector coupled to said signal transfer device to indicate the phase characteristic of said device.

12. Apparatus for analyzing and indicating the transmission characteristics of a signal transfer device having a predetermined frequency pass band, said apparatus comprising, first and second sources of test signals, each varying periodically through a range of frequencies corresponding substantially to said predetermined frequency pass band, said first and second test signals differing from one another at all points in their respective ranges by a given frequency, a frequency mixer having input terminals coupled to said test signal sources and an output terminal coupled to said signal transfer device, means including an amplitude modulation detector coupled to said signal transfer device to indicate the amplitude characteristic of said device, and means including a frequency modulation detector coupled to said signal transfer device to indicate the phase characteristic of said device.

References Cited in the file of this patent

UNITED STATES PATENTS

| Number | Name | Date |
|---|---|---|
| 2,416,310 | Hansen et al. | Feb. 25, 1947 |
| 2,452,587 | McCoy | Nov. 2, 1948 |
| 2,530,596 | Blok | Nov. 21, 1950 |
| 2,595,263 | Ingalls | May 6, 1952 |